(12) United States Patent
Liu (10) Patent No.: US 6,980,045 B1
(45) Date of Patent: Dec. 27, 2005

(54) MERGED CHARGE PUMP

(75) Inventor: Ping-Chen Liu, Fremont, CA (US)

(73) Assignee: Xilinx, Inc., San Jose, CA (US)

( * ) Notice: Subject to any disclaimer, the term of this patent is extended or adjusted under 35 U.S.C. 154(b) by 59 days.

(21) Appl. No.: 10/729,658

(22) Filed: Dec. 5, 2003

(51) Int. Cl.[7] .................................. G05F 3/08
(52) U.S. Cl. ........................ 327/536; 363/59
(58) Field of Search ............ 327/536, 537; 363/59–61; 365/189.09

(56) References Cited

U.S. PATENT DOCUMENTS

| | | | |
|---|---|---|---|
| 5,732,039 A | | 3/1998 | Javanifard et al. |
| 5,754,476 A | | 5/1998 | Caser et al. |
| 5,767,735 A | * | 6/1998 | Javanifard et al. ........ 327/536 |
| 6,121,821 A | * | 9/2000 | Miki ........................ 327/536 |
| 6,151,229 A | * | 11/2000 | Taub et al. ................ 363/60 |
| 6,369,642 B1 | * | 4/2002 | Zeng ........................ 327/536 |
| 2004/0095806 A1 | * | 5/2004 | Osawa et al. ........... 365/185.18 |

OTHER PUBLICATIONS

Tanzawa, Toru et al.; "Circuit Techniques for a 1.8-V-Only NAND Flash Memory," IEEE Journal of Solid-State Circuits, Jan. 2002, vol. 37, No. 1, IEEE, 3 Park Avenue, 17th Floor, New York, NY 10016-5997, pp. 84-89.

* cited by examiner

*Primary Examiner*—Timothy P. Callahan
*Assistant Examiner*—Terry L. Englund
(74) *Attorney, Agent, or Firm*—William L. Paradice, III (57) ABSTRACT

A charge pump circuit for generating various pumped voltages includes a first charge pump including a plurality of first charge pump stages responsive to a first set of clock signals and having threshold voltage cancellation circuitry, a second charge pump including a plurality of second charge pump stages responsive to a second set of clock signals different from the first clock signals, and a switching circuit configured to selectively connect the second charge pump in series between the first charge pump and a voltage rail in response to a mode signal (MODE). For some embodiments, a plurality of the charge pump circuits can be selectively connected in parallel in response to corresponding select signals to generate various drive currents.

45 Claims, 6 Drawing Sheets

MERGED CHARGE PUMP

FIELD OF INVENTION

The present invention relates generally to integrated circuits, and more specifically to charge pumps.

DESCRIPTION OF RELATED ART

Non-volatile semiconductor memories are used to store data for a wide variety of electrical devices including programmable logic devices (PLDs) such as field programmable gate arrays (FPGAs) and complex PLDs (CPLDs). One type of non-volatile semiconductor memory device often used to store firmware code and other non-volatile data in PLDs is the flash Electrically Erasable Programmable Read-only Memory (Flash EEPROM). A flash memory cell typically includes an NMOS floating gate transistor that can selectively store charge on its floating gate to indicate either a programmed state or an erased state. As known in the art, many flash memory cells used in modern electrical devices require various negative voltages to implement program, erase, and read operations. For example, some flash memory cells used in PLDs available from Xilinx, Inc. require the application of approximately −10 volts to the flash cell's control gate to remove charge from the floating gate during program operations, approximately −8 volts on the cell's source and well regions to inject charge into the cell's floating gate during erase operations, and approximately −2 volts on the unselected word lines of the flash memory array during read operations.

Typically, separate negative charge pumps are used to generate the various negative voltages required for programming, erasing, and reading flash memory cells, which can consume valuable silicon area and dissipate large amounts of power. Further, as supply voltages continue to decrease, it becomes more difficult to efficiently generate large negative voltages. Thus, there is a need for a negative charge pump circuit that can generate a variety of different negative voltages using low supply voltages without sacrificing efficiency.

SUMMARY

In accordance with the present invention, a charge pump can selectively generate a variety of pumped voltages. In some embodiments, the charge pump may have a dynamically adjustable drive current. The charge pump includes a plurality of charge pump circuits selectively connected in parallel with each other to provide various amounts of drive current on a voltage rail. Each of the charge pump circuits includes a first charge pump having a plurality of first pump stages connected between corresponding input and output nodes, a second charge pump having a plurality of second pump stages connected between corresponding input and output nodes, and a switching circuit configured to selectively connect the second charge pump in series with the first charge pump to generate various pumped voltages on the voltage rail.

For some embodiments, the first charge pump is configured to optimize efficiency and the second charge pump is configured to generate a maximum pumped voltage. For one embodiment, the first charge pumps include threshold voltage cancellation circuitry and are driven by a four-phase clock signal, while the second charge pumps do not include voltage cancellation circuitry and are driven by a two-phase boosted clock signal. As a result, the first charge pumps are more efficient than the second charge pumps, and the second charge pumps can generate larger pumped voltages than the first charge pumps. Thus, when it is desired to generate relatively small pumped voltages on the voltage rail, the switching circuit de-couples the second charge pump from the first charge pump. In this configuration, only the first charge pump drives the voltage rail, thereby minimizing power consumption. Conversely, when it is desired to generate relatively large pumped voltages on the voltage rail, the switching circuit connects the first and second charge pumps together in series. In this configuration, the second charge pump supplements operation of the first charge pump to generate larger pumped voltages.

Further, for some embodiments, the four-phase clock signal has a voltage swing approximately equal to the supply voltage (VCC), and the two-phase clock signal has a boosted voltage swing approximately equal to 2*VCC. For one embodiment, the four-phase clock signal has a voltage swing between approximately 0 volts and VCC, and the two-phase boosted clock signal has a voltage swing between approximately −VCC and approximately VCC.

BRIEF DESCRIPTION OF THE DRAWINGS

The features and advantages of the present invention are illustrated by way of example and are by no means intended to limit the scope of the present invention to the particular embodiments shown, and in which.

Like reference numerals refer to corresponding parts throughout the drawing figures.

DETAILED DESCRIPTION

The present invention is applicable to a variety of integrated circuits and systems. The present invention has been found to be particularly applicable and beneficial for providing various negative voltages and drive currents to non-volatile memory circuits such as flash memory. Thus, although some aspects of the present invention are described with respect to flash memory, it is to be understood that embodiments of the present invention are equally applicable for providing various negative voltages and/or various drive currents to other suitable integrated circuit devices. Moreover, although some aspects of the present invention are described with respect to providing negative pumped voltages, it will be readily apparent to those of skill in the art that embodiments of the present invention are equally applicable for providing positive pumped voltages. In the following description, for purposes of explanation, specific nomenclature is set forth to provide a thorough understanding of the present invention. In other instances, well-known circuits and devices are shown in block diagram form to avoid obscuring the present invention. Further, the logic levels assigned to various signals in the description below are arbitrary and, thus, can be modified (e.g., reversed polarity) as desired. Accordingly, the present invention is not to be construed as limited to specific examples described herein but rather includes within its scope all embodiments defined by the appended claims.

Figure 1:
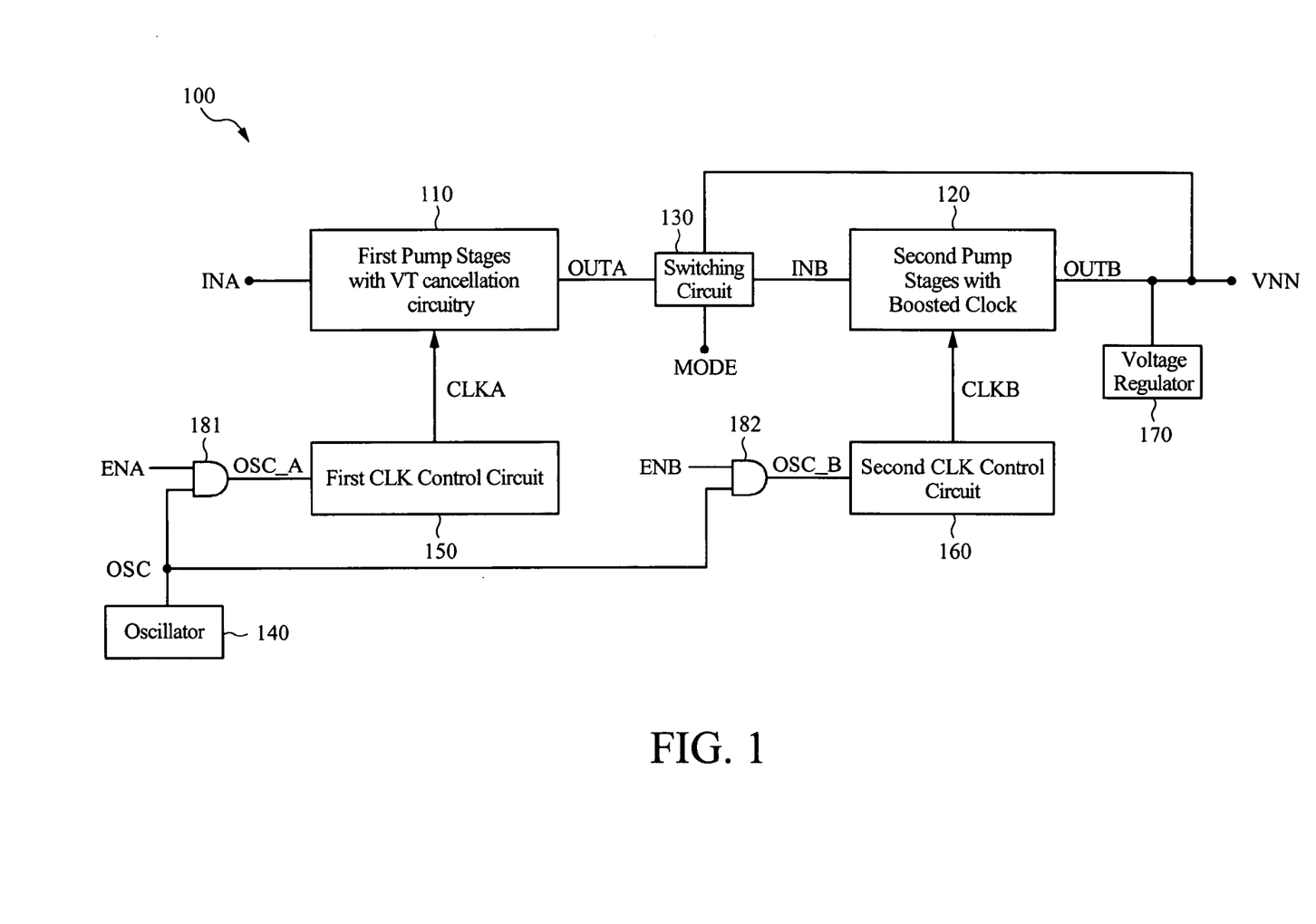
FIG. 1 is a block diagram of a negative charge pump circuit including first and second charge pumps selectively connected together in accordance with one embodiment of the present invention.

FIG. 1 shows a general block diagram of a negative charge pump circuit 100 in accordance with one embodiment of the present invention. Charge pump circuit 100, which includes a first charge pump 110, a second charge pump 120, a switching circuit 130, an oscillator circuit 140, a first clock control circuit 150, a second clock control circuit 160, a voltage regulator 170, and AND gates 181–182, can generate various negative pumped voltages on a negative voltage rail VNN. Voltage regulator 170 is well-known, and regulates the negative output voltage on VNN to a predetermined voltage (e.g., by using a reference voltage). For some embodiments, an associated device (not shown for simplicity) connected to VNN can instruct voltage regulator 170 to regulate VNN to a desired voltage. For example, a flash memory device connected to VNN can instruct voltage regulator 170 to maintain VNN at various voltage levels in response to the operational mode (e.g., program, erase, and read operations) of the flash memory device.

Further, although not shown in FIG. 1 for simplicity, charge pump circuit 100 includes power terminals coupled to ground potential and to a supply voltage VCC. For the exemplary embodiments described herein, VCC=2.5 volts. For other embodiments, VCC can have other values.

Oscillator circuit 140, which is well-known, generates an oscillation signal OSC having a voltage swing approximately between ground potential and VCC. OSC can have any suitable frequency. For some embodiments, OSC has a frequency of approximately 15 MHz, although for other embodiments OSC can have other frequencies. Further, although shown in FIG. 1 as being part of charge pump circuit 100, for other embodiments oscillator circuit 140 can be external to (e.g., off-chip) charge pump circuit 100.

The oscillation signal OSC is provided to first inputs of AND gates 181 and 182. AND gate 181 has a second input to receive a first enable signal ENA, and an output which selectively provides OSC as OSC_A to a clock input of first clock control circuit 150 in response to ENA. Similarly, AND gate 182 has a second input to receive a second enable signal ENB, and an output which selectively provides OSC as OSC_B to a clock input of second clock control circuit 160 in response to ENB. Thus, when ENA and ENB are asserted (e.g., to logic high), AND gate 181 propagates OSC_A to first clock control circuit 150 and AND gate 182 propagates OSC_B to second clock control circuit 160. Conversely, when ENA and ENB are de-asserted (e.g., to logic low), AND gates 181 and 182 force their respective output signals OSC_A and OSC_B to logic low (e.g., ground potential), which in turn disables respective charge pumps 110 and 120. For other embodiments, AND gates 181–182 can be eliminated.

Figure 5:
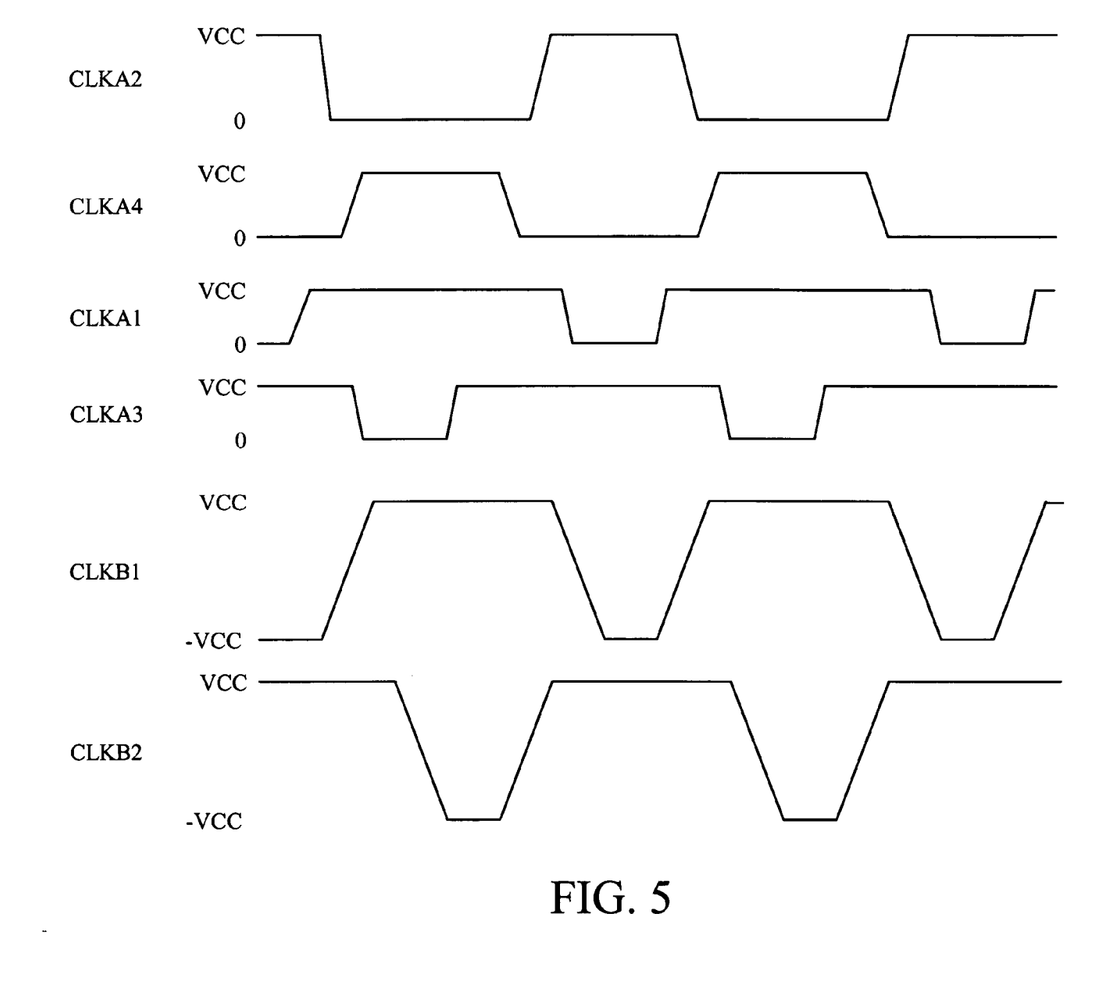
FIG. 5 is an exemplary timing diagram illustrating various clock waveforms for operating one embodiment of the charge pump of FIG. 1.

First clock control circuit 150 can be any well-known clock circuit that generates a four-phase clock signal CLKA for first charge pump 110 in response to OSC as illustrated, for example, in the timing diagram of FIG. 5. For other embodiments, other clock signals can be used to control first charge pump 110. Second clock control circuit 160 can be any well-known clock circuit that generates a two-phase boosted clock signal CLKB for second charge pump 120 in response to OSC as illustrated, for example, in the timing diagram of FIG. 5. For other embodiments, other clock signals can be used to control second charge pump 120.

First charge pump 110 includes a plurality of first pump stages (not shown in FIG. 1 for simplicity) connected in series between an input node INA and an output node OUTA. The pump stages of first charge pump 110 include threshold voltage cancellation circuitry and are controlled by the four-phase clock signal CLKA, which for some embodiments has a voltage swing approximately equal to VCC. The threshold voltage cancellation circuitry, which is well-known, maximizes efficiency by canceling the threshold voltage drop (e.g., the diode drop) across corresponding pump stages of first charge pump 110. However, as the negative voltages generated by successive stages of first charge pump 110 become larger, the voltage cancellation circuitry becomes less able to cancel the diode drops across the pump stages. Further, as supply voltages continue to decrease, the voltage swing of CLKA decreases and becomes less able to generate large negative voltages at the output node OUTA.

Second charge pump 120 includes a plurality of second pump stages (not shown in FIG. 1 for simplicity) connected in series between an input node INB and an output node OUTB. The pump stages of second charge pump 120 do not include threshold voltage cancellation circuitry, and are controlled by the boosted two-phase clock signal CLKB. Driving the second charge pump 120 with the boosted clock signal CLKB, which for some embodiments has a voltage swing approximately equal to 2*VCC, allows second charge pump 120 to generate larger negative voltages than first charge pump 110.

Switching circuit 130 includes a first terminal connected to the output node OUTA of first charge pump 110, a second terminal connected to the input node INB of second charge pump 120, a third terminal connected to VNN, and a control terminal to receive a mode signal MODE. In response to MODE, switching circuit 130 selectively couples second charge pump 120 in series with first charge pump 110. For example, when MODE is in a first state, switching circuit 130 connects OUTA to INB and de-couples OUTA from VNN. In this configuration, the first and second charge pumps 110 and 120 are connected in series and together generate the negative output voltage on VNN. When MODE is in a second state, switching circuit 130 connects OUTA to VNN and de-couples INB from OUTA. In this configuration, only the first charge pump 110 is used to generate the negative output voltage on VNN.

The ability of charge pump circuit 100 to selectively connect the second charge pump 120 in series with the first charge pump 110 is particularly advantageous where an associated device (not shown for simplicity) connected to VNN requires both relatively small negative voltages and relatively large negative voltages. For example, as mentioned above, some flash memory devices require relatively small negative voltages (e.g., approximately −2 volts) for read operations and require relatively large negative voltages (e.g., between −8 and −10 volts) for erase and program operations. Accordingly, when relatively large negative voltages are required on VNN (e.g., for flash memory erase and program operations), the first and second charge pumps 110 and 120 are connected in series via switching circuit 130 and operate together to maximize the negative pumped voltage generated on VNN. Conversely, when relatively small negative voltages are required on VNN (e.g., for flash memory read operations), the second charge pump 120 is de-coupled from first charge pump 110 via switching circuit 130 so that only the first charge pump 110 is used to generate the negative pumped voltage on VNN, thereby maximizing efficiency of charge pump circuit 100.

Figure 2:
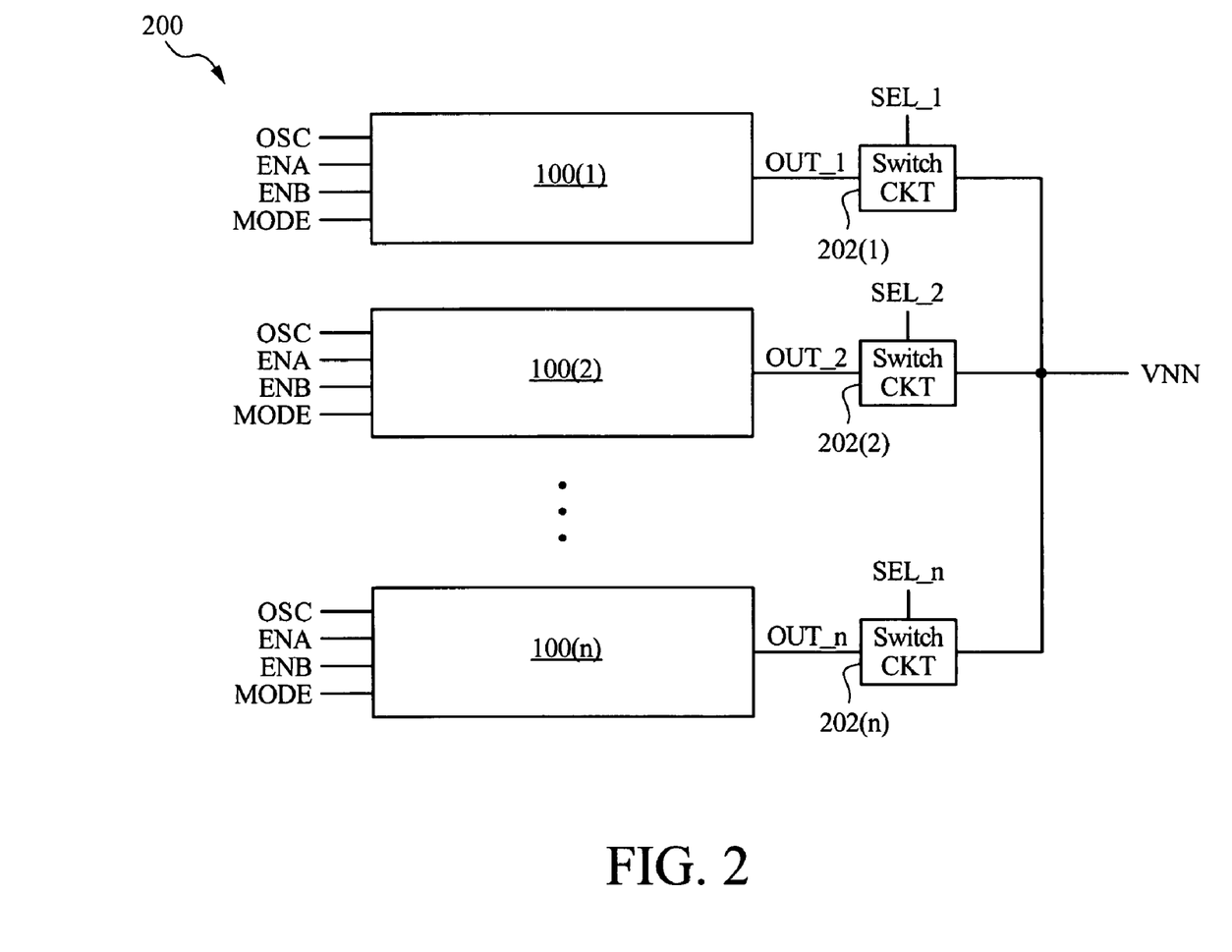
FIG. 2 is a block diagram of a negative charge pump circuit including a plurality of the charge pump circuits of FIG. 1 selectively connected in parallel.

FIG. 2 shows a negative charge pump circuit 200 in accordance with another embodiment of the present invention. Pump circuit 200 includes a plurality of charge pump circuits 100(1)–100(n) of FIG. 1 that can be selectively connected in parallel to provide various levels of drive current to VNN. Each of the charge pump circuits 100(1)–100(n) includes inputs to receive OSC, ENA, ENB, and MODE, and can be used to generate various negative output voltages as described above with respect to FIG. 1. The output of each charge pump circuit 100 is connected to an input of a corresponding switching circuit 202, which in turn includes an output connected to VNN and a control terminal to receive a corresponding select signal SEL. Switching circuits 202(1)–202(n) can be any suitable switching circuit or device. For some embodiments, switching circuits 202(1)–202(n) can be MOS transistors having gates responsive to SEL(1)–SEL(n), respectively. For one embodiment, switching circuits 202(1)–202(n) are PMOS transistors.

Each switching circuit 202 selectively connects the output of a corresponding charge pump circuit 100 to VNN in response to SEL. For example, when SEL_1 is asserted (e.g., to logic high), switching circuit 202(1) connects charge pump circuit 100(1) to VNN so that charge pump circuit 100(1) can drive VNN to the desired negative voltage. Conversely, when SEL_1 is de-asserted (e.g., to logic low), switching circuit 202(1) disconnects charge pump circuit 100(1) from VNN so that charge pump circuit 100(1) does not drive VNN. Thus, the amount of drive current provided to VNN by charge pump 200 can be adjusted by selectively connecting a desired number of charge pump circuits 100(1)–100(n) to VNN via corresponding switching circuits 202(1)–202(n).

For example, when it is desirable to drive VNN with a maximum drive current (e.g., during read and erase operations of an associated flash memory device), all charge pump circuits 100(1)–100(n) can be connected to VNN via switching circuits 202(1)–202(n) by asserting all select signals SEL_1 to SEL_n. Conversely, when it desirable to drive VNN with a minimum drive current (e.g., during program operations of the associated flash memory device), only one of the charge pump circuits 100(1)–100(n) can be connected to VNN via switching circuits 202(1)–202(n) by asserting one of the select signals and de-asserting the other select signals. Of course, charge pump circuit 200 can provide other intermediate levels of drive current to VNN by connecting other numbers of charge pump circuits 100(1)–100(n) to VNN. In this manner, the amount of drive current provided to VNN by charge pump 200 can be dynamically adjusted using the select signals SEL.

The select signals SEL_1 to SEL_n can be generated by any suitable circuit or device. For some embodiments, the select signals are generated in response to instructions or control signals provided by an associated device connected to VNN. For example, in one embodiment, signals indicative of the operational mode of an associated flash memory device connected to VNN can be used to selectively assert SEL_1 to SEL_n.

Figure 3A:
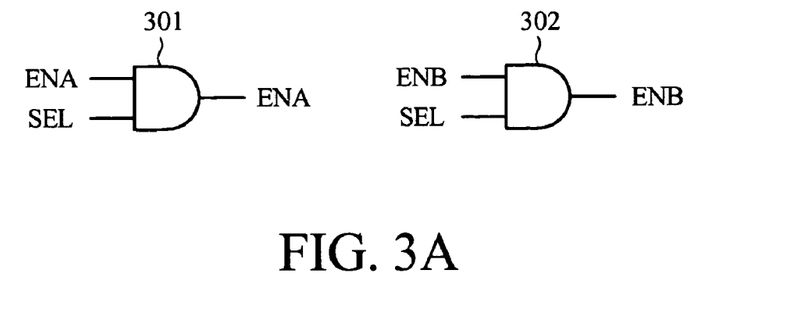
FIG. 3A is a circuit diagram of one embodiment of a select circuit that can be used in the negative charge pump circuit of FIG. 2.
Figure 3B:
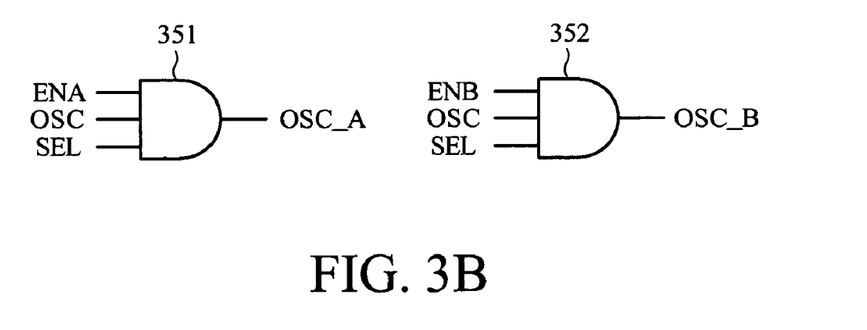
FIG. 3B is a circuit diagram of another embodiment of a select circuit that can be used in the negative charge pump circuit of FIG. 2.

For other embodiments of charge pump circuit 200, switching circuits 202 can be eliminated, and the select signals SEL_1 to SEL_n can be used to selectively enable or disable corresponding charge pump circuits 100(1)–100(n). For example, FIG. 3A shows one embodiment in which ENA can be gated with SEL in an AND gate 301 and ENB can be gated with SEL in an AND gate 302 to selectively disable the first and second charge pumps 110 and 120, respectively, in a corresponding charge pump circuit 100. FIG. 3B shows another embodiment in which each select signal SEL can be combined with ENA and OSC in a first AND gate 351 to generate OSC_A for a corresponding charge pump 100, and combined with ENB and OSC in a second AND gate 352 to generate OSC_B for the corresponding charge pump 100. For the exemplary embodiments of FIGS. 3A and 3B, asserting SEL (e.g., to logic high) enables the first and second charge pumps 110 and 120 of a corresponding charge pump circuit 100 by allowing OSC to pass thereto, while de-asserting SEL (e.g., to logic low) disables the first and second charge pumps 110 and 120 of the corresponding charge pump circuit 100 by forcing OSC to ground potential.

Figure 4A:
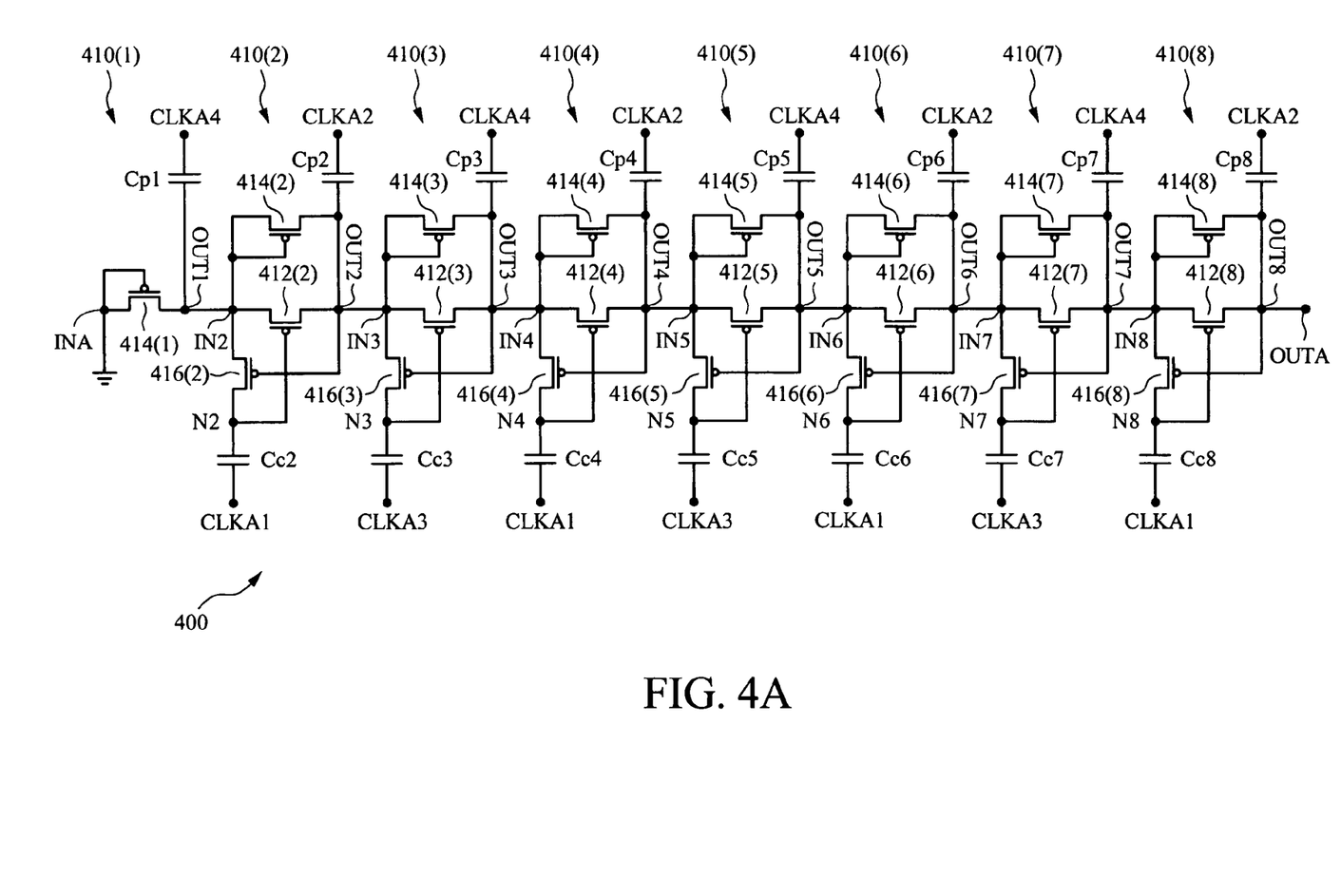
FIG. 4A is a schematic diagram of a charge pump that is one embodiment of the first charge pump of FIG. 1.

FIG. 4A shows a charge pump 400 that is one embodiment of first charge pump 110 of FIG. 1. Charge pump 400 is shown to include eight pump stages 410(1)–410(8) connected in series between INA and OUTA, although for other embodiments charge pump 400 can have other numbers of pump stages. Successive stages 410 of charge pump 400 are controlled by alternating pairs of the four-phase clock signal CLKA. For example, the even-numbered stages 410(2), 410(4), 410(6), and 410(8) are driven by a first clock signal pair CLKA1 and CLKA2, and the odd-numbered stages 410(1), 410(3), 410(5), and 410(7) are driven by a second clock signal pair CLKA3 and CLKA4. For the exemplary embodiment described herein, CLKA1–CLKA4 are generated by first clock control circuit 150 according to the timing diagram of FIG. 5. For other embodiments, charge pump 400 can be controlled by other clock signals. For example, clock signals CLKA1–CLKA4 can have other phase relationships with respect to one another. Further, as illustrated in FIG. 5, CLKA1–CLKA4 have a voltage swing approximately equal to VCC, with the logic high voltage levels of CLKA1–CLKA4 approximately equal to VCC and the logic low voltage levels of CLKA1–CLKA4 approximately equal to 0 volts. For other embodiments, CLKA1–CLKA4 can have other voltage swings and/or can have other logic high and low voltage levels.

Each of pump stages 410(1)–410(8) includes a diode-connected PMOS transistor 414 connected between the stage's input and output nodes, and includes a pump capacitor Cp connected between the stage's output node and a corresponding phase of CLKA. Specifically, each diode-connected transistor 414 has a drain and gate connected to the stage's input node IN and has a source connected to the stage's output node OUT, and each pump capacitor Cp has a first plate coupled to the stage's output node OUT and a second plate coupled to the corresponding clock phase of CLKA. During operation, each pump capacitor Cp pumps its stage's output voltage to a more negative voltage in response to logic high-to-low transitions of the corresponding clock signal CLKA, and each diode 414 prevents negative charge from propagating from the stage's output node OUT to the stage's input node IN. Note that the voltage drop across each diode 414 is approximately equal to the threshold voltage Vtp of PMOS transistor 414.

Pump stages 410(2)–410(8) each include a threshold voltage cancellation circuit formed by corresponding compensation capacitors Cc2–Cc8, PMOS pass transistors 412(2)–412(8), and PMOS compensation transistors 416(2)–416(8). Specifically, for each of pump stages 410(2)–410(8), pass transistor 412 has a source connected to the stage's input node IN, a drain connected to the stage's output node OUT, and a gate connected to the stage's internal node N. The compensation capacitor Cc has a first plate coupled to the stage's internal node N, and a second plate to receive a corresponding clock signal CLKA. The compensation transistor 416 has a source connected to the stage's input node IN, a drain connected to the stage's internal node N, and a gate connected to the stage's output node OUT. The threshold voltage cancellation circuits formed by corresponding pass transistors 412, compensation transistors 416, and compensation capacitors Cc operate to cancel the voltage drop across each pump stage 410 when negative charge is transferred from one stage to the next stage, thereby optimizing the efficiency of charge pump 400 in generating negative pumped voltages.

For other embodiments, the first pump stage 410(1) can include a threshold voltage cancellation circuit similar to that of pump stages 410(2)–410(8). For another embodiment, the threshold voltage cancellation circuit can be eliminated in one or more of pump stages 410(2)–410(8). The pump and compensation capacitors Cp and Cc can be any well-known capacitive elements. For some embodiments, capacitors Cp and Cc are PMOS transistors having a gate serving as the first capacitor plate and having shorted source and drain regions serving as the second capacitor plate. Further, for some embodiments, the well or substrate regions of transistors 412, 414, and 416 are connected to a low voltage such as ground potential.

For earlier semiconductor circuits that utilize a supply voltage VCC=3.3 volts, the threshold voltage cancellation circuitry of pump 400 can be effective in transferring the entire negative charge across a large number of pump stages 410 to more efficiency generate large negative pumped voltages than charge pumps that do not include threshold voltage cancellation circuitry. However, as newer semiconductor circuits utilize increasingly lower supply voltages, the resulting lower voltage swing of CLKA reduces the number of pump stages 410 for which the stage's diode drop can be effectively cancelled by the threshold voltage cancellation circuitry. In addition, decreasing the voltage swing of CLKA reduces the maximum negative output pumped voltage that can be generated by charge pump 400.

For example, as each pump stage 410(1)–410(8) generates a more negative voltage than the previous pump stage, the substrate back-bias voltage of PMOS transistors 412 and 416 of successive stages 410(2)–410(8) becomes increasingly larger, which in turn causes the threshold voltage of transistors 412 and 416 of successive stages 410(2)–410(8) to become increasingly larger. As the magnitude of the threshold voltages of PMOS transistors 412 and 416 increases in successive stages 410(2)–410(8), the logic high voltage level of CLKA becomes increasingly less able to turn on PMOS transistors 412 and 416 in the later pump stages 410(2)–410(8) until the charge pump 400 reaches a saturation point at which the output voltage on VNN reaches a maximum negative value that cannot be made more negative by adding more pump stages 410. Accordingly, as supply voltages continue to decrease, charge pump 400 may no longer be able to generate sufficiently large negative pumped voltages.

Figure 4B:
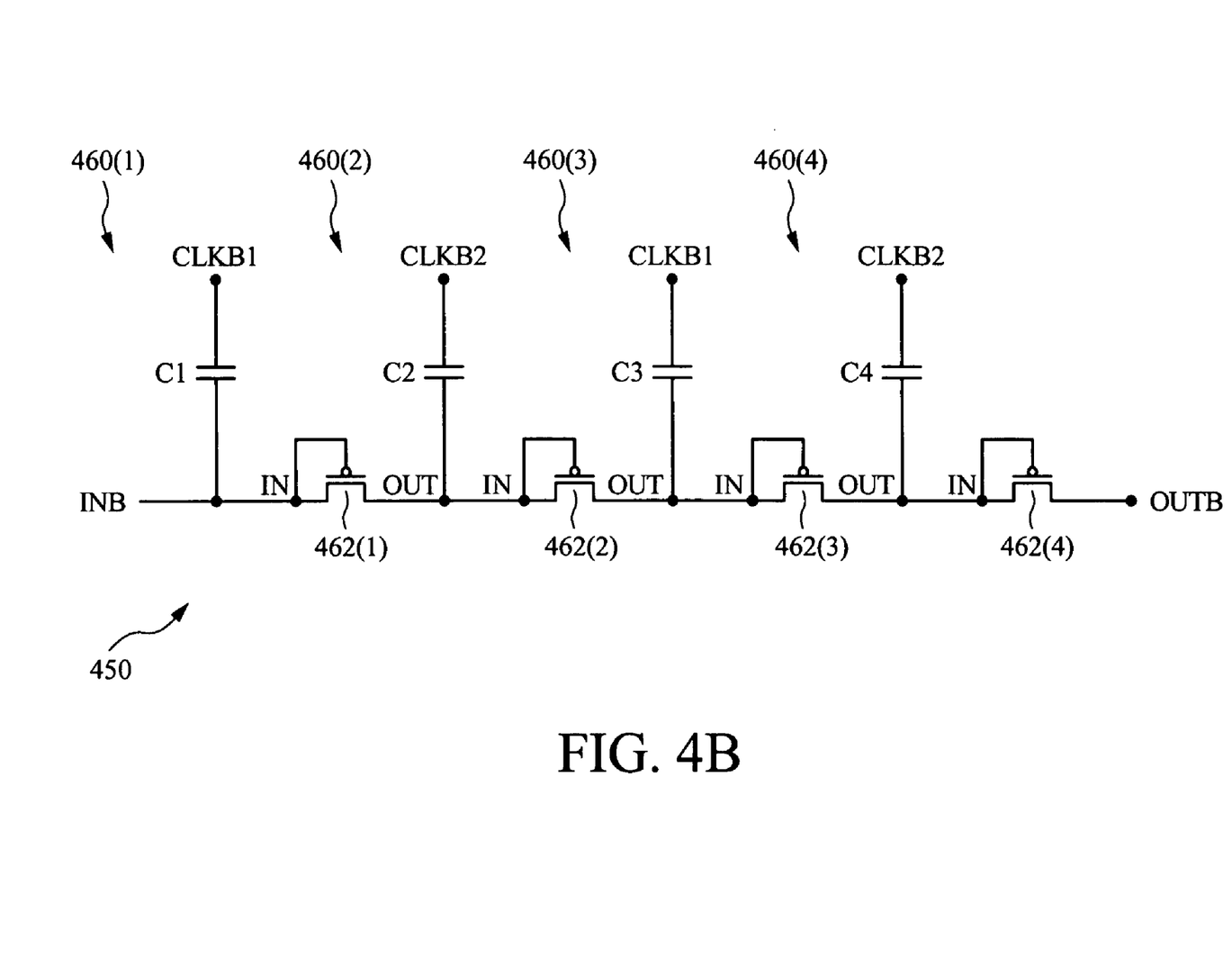
FIG. 4B is a schematic diagram of a charge pump that is one embodiment of the second charge pump of FIG. 1.

To generate even larger negative voltages, the second charge pump 120 can be connected in series with the first charge pump 110 using switching circuit 130, as described above with respect to FIG. 1. FIG. 4B shows a charge pump 450 that is one embodiment of charge pump 120 of FIG. 1. Charge pump 450 is shown to include four pump stages 460(1)–460(4) connected in series between INB and OUTB, although for other embodiments charge pump 450 can have other numbers of pump stages. Charge pump 450 is controlled by two clock signals CLKB1 and CLKB2, which for the exemplary embodiment described herein are generated by second clock control circuit 160 according to the timing diagram of FIG. 5.

For other embodiments, charge pump 450 can be controlled by other clock signals. For example, clock signals CLKB1–CLKB2 can have other phase relationships with respect to one another. However, the relative phase relationship between CLKB and CLKA indicated in FIG. 5 should be maintained to ensure that the pumping actions of the first and second charge pumps 110/400 and 120/450 are synchronized with each other. Further, as illustrated in the exemplary timing diagram of FIG. 5, CLKB1–CLKB2 have a boosted voltage swing approximately equal to 2*VCC, with the logic high voltage level of CLKB1–CLKB2 approximately equal to +VCC and the logic low voltage level of CLKB1–CLKB2 approximately equal to −VCC. For other embodiments, CLKB1–CLKB2 can have other voltage swings and/or can have other logic high and low voltage levels.

Each of pump stages 460(1)–460(4) includes a diode-connected PMOS transistor 462 and a pump capacitor C. Each diode 462 is connected between the stage's input IN and output OUT nodes, and prevents negative charge from flowing from the stage's output node OUT to the stage's input node IN. Each pump capacitor C has a first plate coupled to the input of the pump stage and a second plate coupled to a corresponding clock signal CLKB, and pumps the stage's output voltage to a more negative voltage in response to the corresponding clock signal CLKB. For the exemplary embodiment illustrated in FIG. 4B, the pump capacitors of odd-numbered pump stages 460(1) and 460(3) are driven by CLKB1, and the pump capacitors of even-numbered pump stages 460(2) and 460(4) are driven by CLKB2.

The pump capacitors C1–C4 can be any well-known capacitive elements. For some embodiments, capacitors C1–C4 are PMOS transistors having a gate serving as the first capacitor plate and having shorted source and drain regions serving as the second capacitor plate. Further, for some embodiments, the well or substrate regions of transistors 462 are connected to a low voltage such as ground potential.

For the embodiment of FIG. 4B, pump stages 462 of charge pump 450 do not include threshold voltage cancellation circuitry, thereby conserving valuable silicon area. In addition, without the threshold voltage cancellation circuitry, charge pump 450 can be driven with a two-phase clock signal instead of a four-phase clock signal, which further reduces circuit complexity and cost. Of course, for other embodiments, charge pump 450 can include threshold voltage cancellation circuitry and be driven by a four-phase clock signal, for example, in a manner similar to that described above with respect to charge pump 400 of FIG. 4A.

Further, as mentioned above, clock signals CLKB1 and CLKB2 have a boosted voltage swing equal to approximately 2*VCC. Driving charge pump 450 with clock signals that have a boosted voltage swing equal to approximately 2*VCC increases the amount by which pump capacitors C1–C4 can pump their respective stages' outputs to more negative voltages, which in turn increases the maximum negative pumped voltage that can be generated at OUTB. Accordingly, when charge pump 450 is connected in series with charge pump 400, very large negative pumped voltages can be generated on VNN. For an exemplary embodiment in which charge pump circuit 100 includes first charge pump 400 and second charge pump 450 and VCC=2.5 volts, charge pump 100 can pump VNN to voltages more negative than −10 volts.

As illustrated in FIG. 5, CLKB1 and CLKB2 have a voltage swing approximately between VCC and −VCC. Although the 2*VCC voltage swing of CLKB1 and CLKB2 can have other logic low and high voltage levels, Applicants have found that setting the logic low and high voltage levels of CLKB1 and CLKB2 to −VCC and VCC, respectively, allows for optimal performance of charge pump 450. For example, if CLKB1 and CLKB2 have logic low and high voltage levels of 0 volts and 2*VCC, respectively, and capacitors C1–C4 are PMOS transistors, the 2*VCC voltage level during logic high transitions of CLKB can undesirably forward bias the source/well and drain/well junctions of the PMOS capacitors, which in turn can undesirably limit the negative output pumped voltage generated on VNN.

Figure 6:
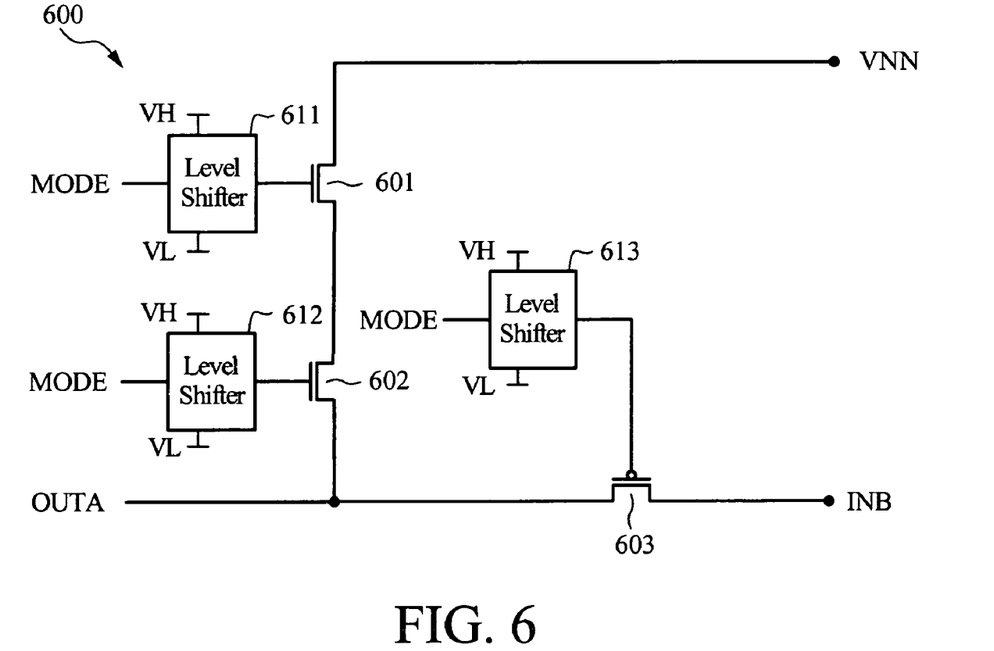
FIG. 6 is a schematic diagram of one embodiment of the switching circuit of FIG. 1.

FIG. 6 shows a switching circuit 600 that is one embodiment of the switching circuit 130 of FIG. 1. Switching circuit 600 includes NMOS transistors 601–602, a PMOS transistor 603, and voltage level shifter circuits 611–613. NMOS transistors 601–602 are connected in series between VNN and OUTA, with the gate of transistor 601 connected to an output of level shifter circuit 611 and the gate of transistor 602 connected to an output of level shifter circuit 612. PMOS transistor 603 is connected in series between OUTA and INB, and has a gate connected to an output of level shifter circuit 613. Level shifter circuits 611–613 each have a first power terminal connected to a high voltage VH, a second power terminal connected to a low voltage VL, and an input terminal to receive MODE. For other embodiments, transistors 601–603 can be controlled by the same level shifting circuit.

Typically, VH should be a voltage greater than the magnitude of VTp (i.e., the threshold voltage of the PMOS devices in the level shifter circuits), and VL should be less than VNN+VTn (i.e., the threshold voltage of the NMOS transistors 601 and 602. For some embodiments, VH is tied to VCC and VL is tied to VNN, although other voltages can be used.

Level shifter circuits 611–613 are well-known, and drive the respective gates of corresponding transistors 601–603 to either VH or VL in response to MODE to selectively connect the second charge pump 120/450 in series with the first charge pump 110/400 by connecting OUTA to either INB or to VNN. For example, when MODE is in a first logic state (e.g., logic low), level shifters 611–613 drive the gates of transistors 601–603 to VL. In response thereto, PMOS transistor 603 turns on and connects OUTA to INB, and NMOS transistors 601–602 turn off to isolate OUTA from VNN. In this configuration, switching circuit 600 connects the second charge pump 120/450 in series with the first charge pump 110/400 to generate relatively large negative pumped voltages on VNN. Conversely, when MODE is in a second logic state (e.g., logic high), level shifters 611–613 drive the gates of transistors 601–603 to VH. In response thereto, NMOS transistors 601–602 turn on and connect OUTA to VNN, and PMOS transistor 603 turns off to isolate OUTA from INB. In this configuration, switching circuit 600 disconnects the second charge pump 120/450 from the first charge pump 110/400 so that the first charge pump 110/400 can more efficiently generate negative pumped voltages.

The exemplary embodiment shown in FIG. 6 includes two NMOS transistors 601–602 connected in series between OUTA and VNN to prevent forward biasing of the junction between the source/drain regions of transistors 601–602 and their respective P-well substrates, e.g. when VNN is much more negative than OUTA. In this case, the P-well substrate of transistor 601 can be connected to VNN and the P-well substrate of transistor 602 can be connected to OUTA. However, some embodiments of switching circuit 600 can include one NMOS transistor connected between OUTA and VNN. For example, a voltage that is more negative than both OUTA and VNN can be connected to the P-well substrate of such a single NMOS transistor. Further, other embodiments can include more than two NMOS transistors connected between OUTA and VNN.

While particular embodiments of the present invention have been shown and described, it will be obvious to those skilled in the art that changes and modifications may be made without departing from this invention in its broader aspects, and therefore, the appended claims are to encompass within their scope all such changes and modifications as fall within the true spirit and scope of this invention.

What is claimed is:

1. A charge pump circuit for generating a pumped voltage, comprising:
   first charge pump means responsive to a first set of clock signals;
   second charge pump means responsive to a second set of clock signals different from the first clock signals;
   means for selectively connecting the second charge pump means in series with the first charge pump means in response to a mode signal; and
   means for selectively bypassing the second charge pump means to generate the pumped voltage in response to the mode signal.

2. The charge pump circuit of claim 1, wherein the first charge pump means includes threshold voltage cancellation circuitry.

3. The charge pump circuit of claim 2, wherein the second charge pump means does not include threshold voltage cancellation circuitry.

4. The charge pump circuit of claim 1, wherein:
   the means for selectively bypassing comprises a first switch responsive to the mode signal and coupled between an output node of the first charge pump means and a voltage rail; and
   the means for selectively connecting comprises a second switch responsive to the mode signal and coupled between the output node of the first charge pump means and an input node of the second charge pump means.

5. The charge pump circuit of claim 4, wherein the first switch comprises:
   one or more transistors connected in series between the voltage rail and the output node of the first charge pump means; and
   a level shifter circuit having an input responsive to the mode signal and having an output connected to the gates of at least one of the one or more transistors.

6. The charge pump circuit of claim 4, wherein the second switch comprises:
   a pass transistor connected in series between the output node of the first charge pump means and the input node of the second charge pump means; and a level shifter circuit having an input responsive to the mode signal and having an output connected to the gate of the pass transistor.

7. The charge pump circuit of claim 1, wherein the first set of clock signals comprises a four-phase oscillation signal and the second set of clock signals comprises a two-phase oscillation signal.

8. The charge pump circuit of claim 7, wherein the first set of clock signals has a voltage swing approximately equal to a supply voltage (VCC) and the second set of clock signals has a boosted voltage swing approximately equal to 2*VCC.

9. The charge pump circuit of claim 8, wherein the second set of clock signals has a logic high voltage level approximately equal to VCC and has a logic low voltage level approximately equal to −VCC.

10. A charge pump circuit for generating a pumped voltage on a voltage rail, comprising:
a first charge pump including a plurality of first charge pump stages responsive to a four-phase oscillation signal;
a second charge pump including a plurality of second charge pump stages responsive to a two-phase oscillation signal; and
a switching circuit having a first terminal connected to an output of the first charge pump, a second terminal connected to an input of the second charge pump, a third terminal connected to the voltage rail, and a control terminal to receive a mode signal.

11. The charge pump circuit of claim 10, wherein the switching circuit selectively connects the first charge pump to the voltage rail when the mode signal is in a first state.

12. The charge pump circuit of claim 11, wherein the switching circuit connects the first and second charge pumps together in series with the voltage rail when the mode signal is in a second state.

13. The charge pump circuit of claim 10, wherein one or more of the first charge pump stages includes threshold voltage cancellation circuitry, and the second charge pump stages do not include threshold voltage cancellation circuitry.

14. The charge pump circuit of claim 10, wherein the four-phase oscillation signal has a voltage swing approximately equal to a supply voltage (VCC) and the two-phase oscillation signal has a voltage swing approximately equal to 2*VCC.

15. The charge pump circuit of claim 14, wherein the two-phase oscillation signal has a logic high voltage level approximately equal to VCC and has a logic low voltage level approximately equal to −VCC.

16. The charge pump circuit of claim 10, wherein the pumped voltage is a negative pumped voltage, and the voltage rail is a negative voltage rail.

17. A charge pump circuit, comprising:
a plurality of charge pumps, each selectively connected in parallel with each other in response to a corresponding select signal to generate various drive currents for a pumped voltage on a voltage rail, and each comprising:
first charge pump means responsive to a first set of clock signals;
second charge pump means responsive to a second set of clock signals different from the first clock signals; and
means for selectively connecting the second charge pump means in series with the first charge pump means in response to a mode signal.

18. The charge pump circuit of claim 17, wherein each of the means for selectively connecting comprises a first terminal connected to an output of the corresponding first charge pump means, a second terminal connected to an input of the corresponding second charge pump means, a third terminal connected to the voltage rail, and a control terminal to receive the mode signal.

19. The charge pump circuit of claim 17, wherein each of the means for selectively connecting comprises:
a first switch responsive to the mode signal and coupled between an output node of the corresponding first charge pump means and the voltage rail; and
a second switch responsive to the mode signal and coupled between the output node of the corresponding first charge pump means and an input node of the corresponding second charge pump means.

20. The charge pump circuit of claim 19, wherein each of the first switches comprises:
one or more transistors connected in series between the voltage rail and the output node of the corresponding first charge pump means; and
a level shifter circuit having an input responsive to the mode signal and having an output connected to the gates of at least one of the one or more transistors.

21. The charge pump circuit of claim 19, wherein each of the second switches comprises:
a pass transistor connected in series between the output node of the corresponding first charge pump means and the input node of the corresponding second charge pump means; and
a level shifter circuit having an input responsive to the mode signal and having an output connected to the gate of the pass transistor.

22. The charge pump circuit of claim 17, wherein each of the first charge pump means includes threshold voltage cancellation circuitry, and each of the second charge pump means does not include threshold voltage cancellation circuitry.

23. The charge pump circuit of claim 17, wherein the first set of clock signals comprises a four-phase oscillation signal and the second set of clock signals comprises a two-phase boosted oscillation signal.

24. The charge pump circuit of claim 23, wherein the first set of clock signals has a voltage swing approximately equal to a supply voltage (VCC) and the second set of clock signals has a voltage swing approximately equal to 2*VCC.

25. The charge pump circuit of claim 24, wherein the second set of clock signals has a logic high voltage level approximately equal to VCC and has a logic low voltage level approximately equal to −VCC.

26. The charge pump circuit of claim 17, further comprising:
a plurality of switching circuits, each having an input connected to an output of a corresponding one of the plurality of charge pumps, an output connected to the voltage rail, and a control terminal to receive a corresponding select signal.

27. The charge pump circuit of claim 26, wherein each of the switching circuits comprises a PMOS transistor.

28. The charge pump circuit of claim 17, wherein each of the plurality of charge pumps further comprises:
a first logic gate configured to selectively disable the first set of clock signals in response to a corresponding select signal; and
a second logic gate configured to selectively disable the second set of clock signals in response to the corresponding select signal.

29. The charge pump circuit of claim 28, wherein each of the first and second logic gates comprises an AND gate.

30. The charge pump circuit of claim 17, wherein the plurality of charge pumps is a plurality of negative charge pumps, the pumped voltage is a negative pumped voltage, and the voltage rail is a negative voltage rail.

31. A charge pump circuit for generating various pumped voltages on a voltage rail with various drive currents, comprising:
- a plurality of charge pumps, each including an output terminal and comprising:
  - a first charge pump including a plurality of first charge pump stages;
  - a second charge pump including a plurality of second charge pump stages; and
  - a first switching circuit configured to selectively connect the second charge pump in series with the first charge pump in response to a mode signal; and
- a plurality of second switching circuits, each having an input coupled to the output terminal of a corresponding charge pump, an output coupled to the voltage rail, and a control terminal to receive a corresponding select signal.

32. The charge pump circuit of claim 31, wherein each of the first switching circuits comprises a first terminal connected to an output of the corresponding first charge pump, a second terminal connected to an input of the corresponding second charge pump, a third terminal connected to the voltage rail, and a control terminal to receive the mode signal.

33. The charge pump circuit of claim 32, wherein each of the first switching circuits comprises:
- a first switch responsive to the mode signal and coupled between the output of the corresponding first charge pump and the voltage rail; and
- a second switch responsive to the mode signal and coupled between the output of the corresponding first charge pump and an input of the corresponding second charge pump.

34. The charge pump circuit of claim 31, wherein each of the first charge pumps is controlled by a four-phase oscillation signal and each of the second charge pumps is controlled by a two-phase oscillation signal.

35. The charge pump circuit of claim 34, wherein the four-phase oscillation signal has a voltage swing approximately equal to a supply voltage (VCC) and the two-phase oscillation signal has a voltage swing approximately equal to 2*VCC.

36. The charge pump circuit of claim 35, wherein the two-phase oscillation signal has a logic high voltage level approximately equal to VCC and has a logic low voltage level approximately equal to −VCC.

37. The charge pump circuit of claim 31, wherein each of the first charge pumps includes threshold voltage cancellation circuitry and each of the second charge pumps does not include threshold voltage cancellation circuitry.

38. The charge pump circuit of claim 31, wherein the pumped voltages are negative pumped voltages, the voltage rail is a negative voltage rail, and the plurality of charge pumps is a plurality of negative charge pumps.

39. A method for generating pumped voltages on a voltage rail, comprising:
- selectively connecting a plurality of charge pump circuits in parallel with each other in response to a plurality of corresponding select signals to adjust the drive current on the voltage rail; and
- within each of the charge pump circuits, selectively connecting a second charge pump circuit in series with a first charge pump circuit in response to a mode signal to adjust the magnitude of the pumped voltages generated on the voltage rail.

40. The method of claim 39, wherein asserting the mode signal connects the first and second charge pumps in series between input and output terminals of the corresponding charge pump circuit.

41. The method of claim 39, wherein de-asserting the mode signal connects only the first charge pump between input and output terminals of the corresponding charge pump circuit.

42. The method of claim 39, wherein asserting the select signal connects the output terminal of the corresponding charge pump circuit to the voltage rail.

43. The method of claim 39, wherein de-asserting the select signal disconnects the output terminal of the corresponding charge pump circuit from the voltage rail.

44. The method of claim 39, wherein de-asserting the select signal disables the corresponding charge pump circuit by forcing its input clock signals to logic low.

45. The method of claim 39, wherein the pumped voltages are negative pumped voltages, the voltage rail is a negative voltage rail, and the plurality of charge pump circuits is a plurality of negative charge pump circuits.

* * * * *